May 2, 1933.  D. L. SUMMEY  1,907,130
MOLDING APPARATUS
Filed Oct. 17, 1930  5 Sheets-Sheet 1

INVENTOR
David L. Summey
BY
ATTORNEYS

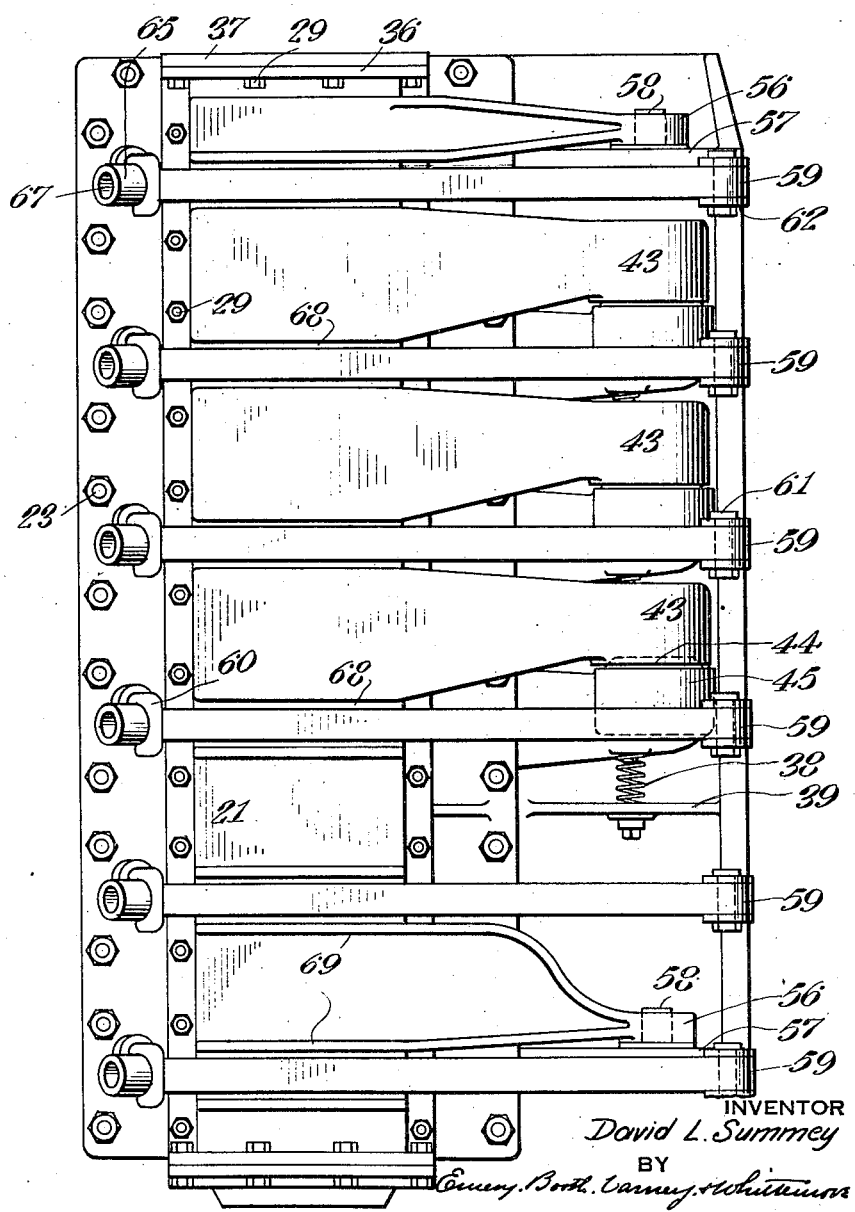

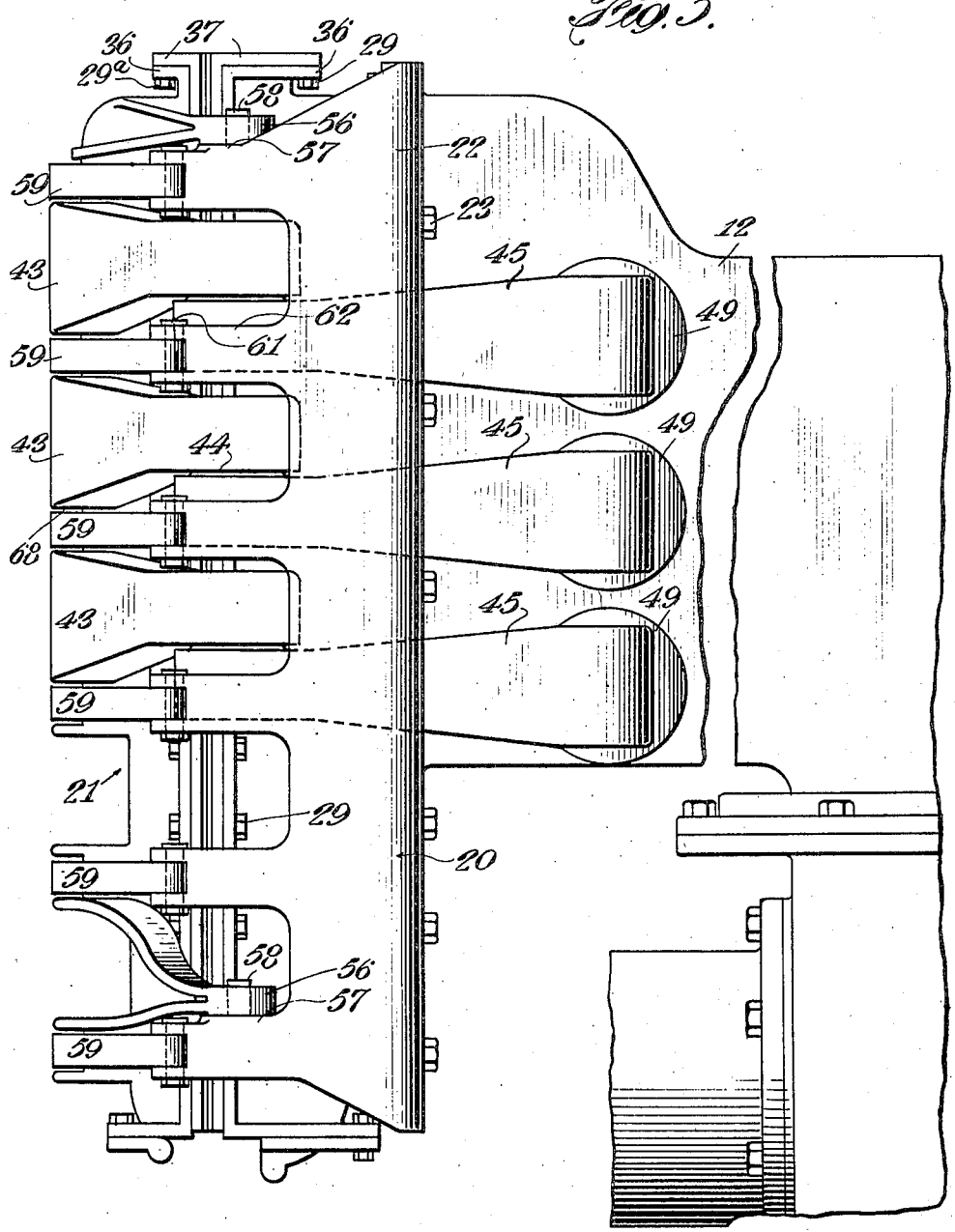

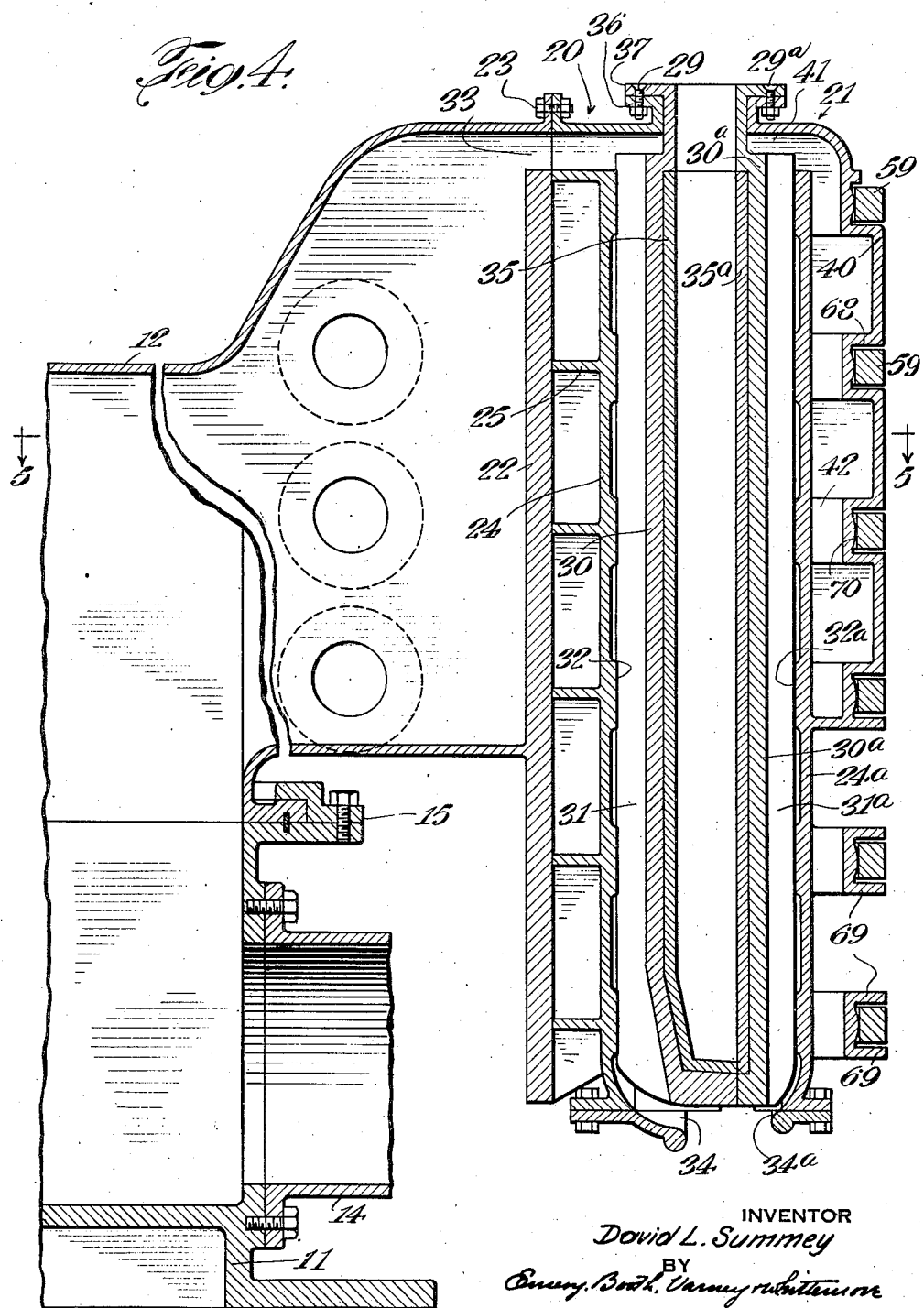

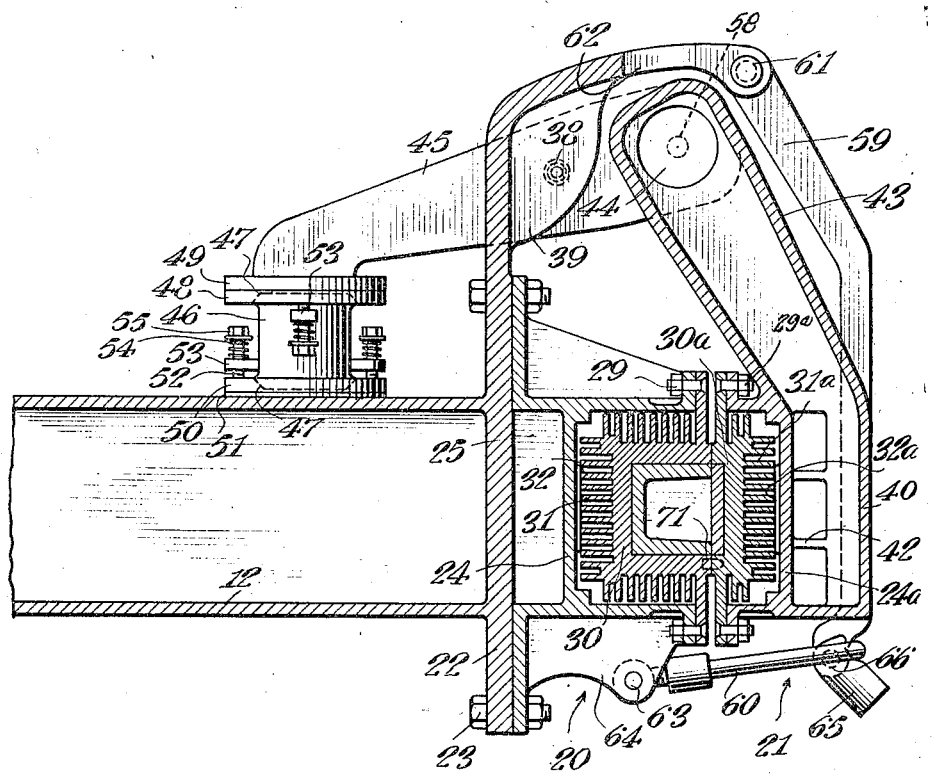

Patented May 2, 1933

1,907,130

UNITED STATES PATENT OFFICE

DAVID L. SUMMEY, OF WATERBURY, CONNECTICUT; THE COLONIAL TRUST COMPANY AND RICHARD P. WEEKS SUMMEY EXECUTORS OF SAID DAVID L. SUMMEY, DECEASED

MOLDING APPARATUS

Application filed October 17, 1930. Serial No. 489,263.

This invention relates to molding apparatus and has for an object the provision of improvements in this art.

The nature and objects of the invention as well as the various new features thereof may best be understood from consideration of a typical embodiment of the invention. One such embodiment will now be disclosed by way of illustration in the following description and accompanying drawings, wherein:

Fig. 2 is front elevation of one of the molding units as viewed from the line 2—2 of Fig. 1;

Fig. 3 is a side elevation of the unit as viewed from the line 3—3 of Fig. 1;

Fig. 4 is a vertical section taken on the line 4—4 of Figs. 1 and 5; and

Fig. 5 is a horizontal section taken on the line 5—5 of Fig. 4.

Figure 1:
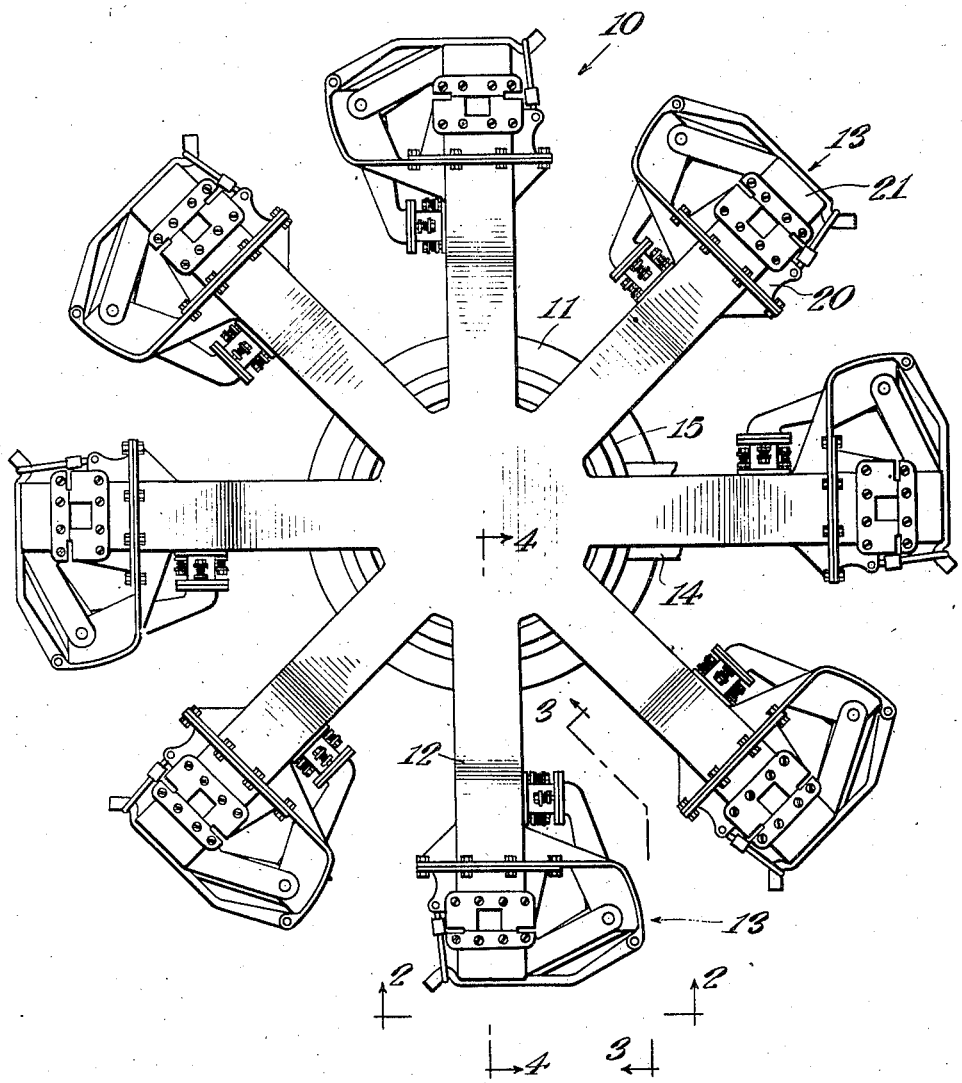
Fig. 1 is a top plan view of a plant or molding wheel carrying a plurality of molding units.

Referring to Fig. 1, the apparatus comprises a mold wheel generally designated by the numeral 10, the wheel being rotatably mounted upon a central stand 11. The wheel includes a plurality of arms 12 supporting a like number (eight as shown) of mold units 13. If the weight of the mold units is too great for the arms, any convenient auxiliary supporting means may be provided.

The molds are cooled by fluid (see Fig. 4) so the base stand 11 and arms 12 are hollow and act as ducts. Fluid is supplied to the interior of the stand by a supply main 14. Any usual fluid tight joint 15 may provide relative rotation between the stand and the hub of the wheel supported thereon.

Only a single duct is herein shown for each arm but this is because air is used as the cooling fluid and is discharged as soon as used. If water is used the duct system will be appropriately modified.

The mold is of the divided type. As best shown in Figs. 4 and 5 it comprises the fixed part 20 and the movable part 21.

The fixed part 20 is mounted upon a vertical plate 22 disposed at the end of the arm 12, being secured thereto by a plurality of bolts 23. The outer wall 24 of the fixed mold part is provided with fins 25 cooperating with the plate 22 to provide cellular spaces between the plates for heat insulation.

Within the wall 24 there is secured by bolts 29 an interior mold wall 30 provided on three sides exteriorly with integral vertical heat radiating fins 31, preferably machined on their outer surfaces for good contact. The wall 24 interiorly is provided with lugs 32 engaging the outer edges of the fins 31.

Fluid from the duct in the arm 12 enters the upper end of the space between the walls 24 and 30 by way of a lead-in duct 33 branching upward from the duct in the arm.

Fluid (if air is used) leaves the mold by way of a bottom opening 34 after passing downward between the vertical fins 31.

Inasmuch as the interior of these molds wears until unsuitable for use and as the molds are expensive to renew, a replaceable metal lining wall 35 is provided either when the molds are new or after they become worn. In the latter case the molds are cut back from original size to take the lining. The lining is held rigidly in place, preferably by shrinking the wall 30 thereon. In use the lining wall will maintain its tight fit within the wall 30 because after initial attachment it is always heated to a higher temperature and expands more than the wall 30 so as to wedge itself in its recess. This wedging action is the better insured by having the lining wall recessed into the retaining wall on all edges.

The mating or swingable mold part is similarly formed with the lining wall 35a, an inner wall 30a having fins 31a, outer wall 24a having lugs 32a, and a bottom opening 34a. The walls 24a and 30a are secured together by bolts 29a. Here it is to be noted that the upper ends of the walls 24, 30, 24a, 30a are provided with horizontal flanges 36, 37 through which the bolts 29, 29a pass, thus avoiding vertically disposed spaces between the walls into which metal might be poured. The billet cavity may be divided between the mold parts in any desired manner. Here it is shown to be formed entirely in the fixed part.

The upper portion of the wall 24a is provided with a casing wall 40 forming a duct 41 leading upwardly into the space between the cooling fins 31a. Vertical ribs 42 within the duct 41 brace the wall 24a to the wall 40.

The casing wall 40 is extended laterally (Figs. 2, 3 and 5) to form a plurality of swinging conduits 43 hinged at 44 to substantially fixed conduits 45. Any suitable joint may be provided at the hinge to prevent leakage of fluid thereat. As shown, the conduits 45 are pressed tightly against the conduits 43 by heavy springs 38 supported on flanges 39. Nuts provide adjustment for the springs.

The conduits 45, though substantially fixed, are arranged to have some movement. This is desirable because it is impossible or at least impracticable to maintain the swinging action of the mold true. Usually the hinge pins are loose in their holes either because of wear or because they are made so to provide easy swinging movement. Further than this, the great weight of the mold disaligns the hinges.

The movement of the conduits 45 is provided by a short coupling 46 having spherically ground ends 47 cooperating with spherical sockets formed in a ring 48 secured to the end flange 49 of the conduit 45 and in aiding 50 secured to a lip 51 formed about an opening in the side of arm 12. The rings 48 and 50 are provided with stud bolts 52 projecting through oversized holes in lugs 53 formed on the sides of the coupling 46. Springs 54 and nuts 55 urge the parts tightly together.

These connections will allow movement of the conduits 45 in any direction while maintaining fluid tight joints. As stated above, this movement is necessary because of the loose hinge assembly of the swingable mold part.

The swingable part of the mold is supported on hinge arms 56, 57 attached to the part 21 and to the fixed mold part (say the plate 22) respectively. Pins 58 connect the parts 56 and 57. The axis of pins 58 coincides with the axis of movement between the conduits 43 and 45 with allowable variations provided by the adjustable connection of the conduits.

The mold may be clamped together by bars 59 and cooperating loop links 60, the former being pivoted by pins 61 to brackets 62 formed on a fixed part of the mold and the latter being pivoted by pins 63 to brackets 64 formed on a fixed part of the mold. A cam lever 65 attached to the end of each bar 59 is employed to squeeze the parts together after the loop link has been caught thereover. The cam levers 65 are pivoted on pins 66 and have sockets 67 in their ends to receive operating arms or handles, not shown.

The upper bars 59 (Fig. 4) are held in position by grooves 68 formed in the casing wall 40 while the lower bars are held in the grooves of raised members 69 formed on the walls 24a. All bars act upon spherical lugs 70 formed in the bar-retaining grooves. Dowels 71 may be employed to cause the mold parts to register accurately when closed.

While one embodiment of the invention has been described in detail for purposes of illustration, it is to be understood that various modifications and changes may be made within the scope of the subjoined claims.

I claim as my invention:—

1. Molding apparatus comprising in combination, a mold wheel rotatably supporting a plurality of molds, a plurality of mold supporting arms forming a part of said wheel, ducts in said arms for conveying cooling fluid from the hub of the wheel to said molds, a fixed mold part secured to each of said arms, a cooperating mold part swingably mounted on each of said arms, means for conducting cooling fluid from said arm to the fixed mold part, hinged conduits for conducting cooling fluid from said arm to said swingable mold part, the connection of one conduit of each hinged set comprising a spherical ended coupling cooperating with similarly shaped seats formed in the cooperating parts, apertured lugs on said coupling, bolts from parts at each end of the coupling entering the apertures of said lugs, springs on said bolts bearing against said lugs tending to maintain the connection in alignment, and clamp means including hinged bars and hinged loop links for securing said mold parts together.

2. Molding apparatus comprising in combination, a mold including a fixed part and a hinged part, means for conducting heat exchange fluid through said mold parts, a fixed member comprising a source of supply for fluid, ducts for conveying fluid between said fixed mold part and said fixed member, a pair of hinged conduits for conveying fluid between said hinged mold part and said fixed member, a flexible connection in one of said hinged conduits, and means to clamp said mold parts together.

3. Molding apparatus comprising in combination, a mold including a fixed part and a hinged part, and heat exchange fluid conducting conduits for supplying fluid to one of said mold parts, said conduits being hinged to swing about the hinge axis of the mold, and said conduits also including a flexible joint permitting variation in the position of the hinge axis of said conduits.

4. Moldng apparatus comprising in combination, mold parts hinged together, conduits connected to one of said mold parts and hinged together along the hinge axis of the mold, the conduits being provided with means providing movement of the hinge connection thereof to keep them fluid tight while permitting movement off the axial line of said mold parts.

5. Molding apparatus comprising relatively swingable mold parts, relatively swingable conduits connected to one of the parts and hinged approximately on the hinge axis of the parts, and means including a flexible connection for keeping said conduits fluid tight though permitting lateral movement of the conduit hinge axis relative to the hinge axis of the mold parts.

6. Molding apparatus comprising relatively swingable mold parts and relatively swingable cinduits connected to one of the parts and hinged approximately on the hinge axis of the parts, said conduits including an interposed section having a spherical joint which is forced together by resilient means.

7. Molding apparatus comprising relatively swingable mold parts and relatively swingable conduits connected to one of the parts and hinged approximately on the hinge axis of the parts, the conduits having a loose joint, and a spring supporting one of said hinged conduits and pressing it against the other to maintain the joint fluid tight.

8. Molding apparatus comprising in combination an outer mold wall, an inner mold wall secured thereto, said walls being provided with cooperating contacting vertical fins and ribs, and means including a conduit connecting with the space in the mold for supplying a current of cooling fluid to one end of said mold between said fins, the fluid being exhausted to the atmosphere through an opening in the other end of the mold.

In testimony whereof, I have signed my name to this specification this 15th day of October, 1930.

DAVID L. SUMMEY.